United States Patent
Lauer (10) Patent No.: US 12,015,877 B2
(45) Date of Patent: Jun. 18, 2024

(54) AUTOMATIC CONFIGURATION OF A PLURALITY OF CAMERAS

(71) Applicant: Sick AG, Waldkirch (DE)

(72) Inventor: Roman Lauer, Waldkirch (DE)

(73) Assignee: SICK AG, Waldkirch (DE)

( * ) Notice: Subject to any disclaimer, the term of this patent is extended or adjusted under 35 U.S.C. 154(b) by 69 days.

(21) Appl. No.: 17/217,712

(22) Filed: Mar. 30, 2021

(65) Prior Publication Data

US 2021/0306597 A1 Sep. 30, 2021

(30) Foreign Application Priority Data

Mar. 31, 2020 (EP) .................................... 20167184

(51) Int. Cl.
- *H04N 7/18* (2006.01)
- *H04N 23/56* (2023.01)
- *H04N 23/661* (2023.01)

(52) U.S. Cl.
CPC ............. *H04N 7/181* (2013.01); *H04N 23/56* (2023.01); *H04N 23/661* (2023.01)

(58) Field of Classification Search
CPC .. H04N 7/181; H04N 5/2256; H04N 5/23206; H04N 5/232; H04N 5/232061; H04N 5/2354; H04N 5/247; H04N 7/18; H04N 17/002; H04N 5/23225; G06K 7/10722; G06K 7/10762; G06K 7/10792; G06K 7/10415

See application file for complete search history.

(56) References Cited

U.S. PATENT DOCUMENTS

| 9,230,326 | B1 * | 1/2016 | Liu ........................... G06T 7/80 |
| 9,325,917 | B2 * | 4/2016 | MacMillan ............ H04N 13/00 |
| 10,497,129 | B1 * | 12/2019 | Cui ........................ B64D 47/08 |
| 2012/0314089 | A1 * | 12/2012 | Chang .................... H04N 23/90 348/180 |
| 2015/0326831 | A1 * | 11/2015 | Funagi ................... H04N 7/181 348/159 |
| 2016/0012589 | A1 * | 1/2016 | Hamer ................... H04N 23/90 348/148 |
| 2017/0287166 | A1 * | 10/2017 | Claveau .................... G06T 7/80 |
| 2020/0084366 | A1 * | 3/2020 | Fujiwara ................ H04R 3/005 |
| 2020/0124406 | A1 * | 4/2020 | Gorschenew ........ H04N 17/002 |

FOREIGN PATENT DOCUMENTS

| EP | 2950285 A1 | 12/2015 |
| GB | 2444399 A | 6/2008 |
| GB | 2553108 A | * 2/2018 ............. G06F 16/71 |

* cited by examiner

Primary Examiner — Richard A Hansell, Jr.
(74) Attorney, Agent, or Firm — Nath, Goldberg & Meyer; Jerald L. Meyer; Stanley N. Protigal (57) ABSTRACT

A method is provided for the automatic configuration of a plurality of cameras that each have an image sensor, an illumination, and a communication interface and that are installed such that they together record objects in a detection zone by partially overlapping, mutually complementary fields of view, wherein the cameras are connected via their communication interfaces to form a network. In this process, the cameras produce sample recordings while only specific cameras activate their illumination, a check is made for the respective cameras with reference to the sample recordings whether there is a proximity relationship to a camera having active illumination, and the relative arrangement of the cameras with respect to one another is determined from the proximity relationships.

21 Claims, 5 Drawing Sheets

AUTOMATIC CONFIGURATION OF A PLURALITY OF CAMERAS

FIELD

The invention relates to a method for the automatic configuration of a plurality of cameras and to a multi-camera system in accordance with the preambles of the independent claims.

BACKGROUND

Sensors are used for the automation of processes at a conveyor belt to detect object properties of the conveyed objects and to initiate further processing steps in dependence thereon. The processing in logistics automation typically comprises a sorting; for instance, in automatic parcel identification, for mail shipments, or baggage handling at airports. In addition to general information such as volume and weight of the objects, an optical code applied to the object frequently serves as the most important source of information. In other cases, it is a question of an inspection or of a quality check in which an optical code can, but does not have to, take part.

As digital technology develops further, camera-based code readers are increasingly used for code reading. Instead of scanning code regions such as in a barcode scanner, a camera-based code reader records images of the objects having the codes located thereon with the aid of a pixel-resolved image sensor and image evaluation software extracts the code information from these images. Camera-based code readers also cope without problem with different code types than one-dimensional barcodes which also have a two-dimensional structure like a matrix code and provide more information. In an important application group, the objects bearing the code are conveyed past the code reader. A camera reads the object images having the code information successively with the relative movement.

An individual camera is often not sufficient to record all the relevant information on the objects on a conveying belt. A plurality of sensors are therefore combined in a reading system or a reading tunnel. If a plurality of conveyor belts are disposed next to one another to increase the object throughput or if a widened conveyor belt is used, a plurality of sensors mutually complement one another with respect to their fields of view, which are narrow per se, to cover the total width. In addition, cameras are installed at different perspectives to record codes from all sides (omni reading).

With a plurality of involved cameras, the putting into operation becomes very complex since every camera has to be at least partly configured by hand. Even a basic setting of the communication parameters to integrate the camera in a network in a desired and clearly arranged manner requires substantial time effort and the individual cameras additionally have to be parametrized in accordance with their positions and perspectives.

A conventional procedure begins with the camera being prepared prior to shipment. For this purpose they have to be unpacked individually and connected to a configuration processor to specify parameters for them in accordance with their planned positions within the camera arrangement and they are subsequently packed again and labeled accordingly. The cameras are then installed, connected, and switched on at the operation site in accordance with the labeling. The connected cameras are connected to form a network by means of a device code in a common control computer. A device name and a network configuration are set manually for every single camera in dependence on its position. The network as such also has to be configured.

The individual cameras then run through their own setup that at times, for example, runs automatically for calibration, but also requires manual parameterization. System parameters that have to be set consistently over the camera represent a special challenge here. However, this is the responsibility of the service engineer. There is admittedly a function to transfer the value of a parameter set at one camera to the other cameras. The service engineer has to trigger this function in each case, however, and has to decide when and for which parameters this is required. Since all the cameras are configured after one another and are possibly subsequently reparameterized as part of an optimization, it is easy to lose track of the process.

The previous configuration is accordingly laborious, time consuming, and prone to error. Due to the high number of manual steps, there is also no consistency over different systems, for example with respect to the naming. A service engineer that carries out a service at a system he did not set up will therefore possibly not find his way round, or at least not immediately. A consistent parameterization over the cameras is not ensured and in any case relies to a high degree on the knowledge and concentration ability of the service engineer.

U.S. Pat. No. 9,325,917 B2 discloses an automatic alignment of a multi-camera system. However, it is a question of aligning the fields of view, not the configuration of the assembly. Provision is made that a master camera sets various parameters of its slave cameras. Even this one step, that in no way covers the total required configuration of a reading tunnel, would not be flexible enough for a reading tunnel. The challenge is not to set parameters centrally for all the participants, but rather to synchronize individual changes in any camera actually for the parameters relevant in the whole system.

SUMMARY

It is therefore the object of the invention to simplify the configuration of a system having a plurality of cameras.

This object is satisfied by a method for the automatic configuration of a plurality of cameras and by a multi-camera system in accordance with the respective independent claim. The cameras each have an image sensor for the image recording, a control and evaluation unit for internal settings and processing work, an illumination to illuminate its own field of view, and a communication interface for connection to further cameras and/or to a higher ranking control. The fields of view of the individual cameras supplement one another in a partially overlapping manner by arrangement and perspective of the respective cameras to form a common detection zone. Objects are recorded there, preferably an object stream of objects, that are conveyed through the detection zone by a conveying device at which the cameras are installed. The cameras are connected to form a network via their communication interfaces. This is initially only a physical connection; the logical connection is a result of the configuration.

The invention starts from the basic idea that the cameras independently find out which relative arrangement they are in with respect to one another. This information is used to automatically correctly configure the total system. Specific cameras selectively activate their illumination and the cameras determine by using sample recordings whether they can perceive this illumination and are thus in a proximity relationship with the camera or cameras having a currently active illumination. The selection of the cameras having active illumination changes as often as necessary until the total relative arrangement of the cameras with respect to one another has been determined using the proximity relationships.

The invention has the advantage that the configuration is considerably accelerated and simplified. Fewer manual steps are required, and even no manual steps with respect to the determination of the relative arrangement, except possibly for simple steps such as a triggering of the corresponding function. The configuration is thereby also substantially less prone to error. Finally, a suitable configuration Is achieved reliably and independently of the experience of the service engineer so that the system becomes more powerful.

Sample recordings are preferably repeatedly produced while exactly one camera alternatingly activates its illumination. Even more preferably, each camera here activates its illumination exactly once. Such a schedule is particularly simple and reliably leads to its objective. It is conceivable that a unique arrangement already results before each camera has activated its illumination; a premature aborting can take place in this case. This in particular relates to the last camera that has not yet activated its illumination since all its neighbors had necessarily already had their turn. In principle, completely different schedules can also be conceived where first a specific number of cameras activate their illumination and then, for example, the proximities are first clarified in a reduced subset of cameras by which this illumination was perceived. This could in particular be a kind of binary tree having a respective halved number of cameras having an active illumination. Since, however, it is actually not known how the cameras are arranged because finding this out is actually the aim, such schedules cannot generally be optimized easily and there will practically always be unfavorable configurations in which a more complicated schedule is only subordinate to a fixed order having a respective active illumination of one camera.

First, a local proximity relationship is preferably determined per camera from the information on the direction in which a camera having active illumination is disposed in accordance with the check of the sample recordings and the local proximity relationships with respect to the relative arrangement of the cameras are subsequently collected. The cameras or a higher order control thus first locally determine the direction in which the camera having a active illumination is located. This then produces a provisional local proximity relationship for this camera. This local proximity relationship is updated in further passes with active illumination of other cameras. These local proximity relationships are collected and interlinked after every set of sample recordings, after a certain number of sample recordings, or once at the end. The process can be aborted as soon as a unique arrangement results therefrom. It is conceivable in principle to make the cameras having active illumination dependent on gaps or ambiguities that previously still result in the arrangement for the next set of sample recordings.

These cameras preferably form a row arrangement having a field of view partially overlapping pair-wise. It is, for example, a row of cameras that detect the conveyor belt from above in a reading tunnel. There can be further cameras outside the row arrangement, for example for a detection from the side, from below, or from an oblique perspective. There are then possibly a plurality of row arrangements in which the relative arrangement of the cameras can respectively be found out using the procedure in accordance with the invention. An automatic configuration over all the cameras then not always possible, in particular when the illumination can no longer be mutually perceived at all. The method in accordance with the invention nevertheless substantially facilitates the configuration since only a few groups of individual cameras and no longer a large number thereof have to be combined.

It is first preferably determined per camera by checking the sample recordings whether a camera having active illumination is located at the right, left, or not in the proximity at all and the local proximity relationships thus acquired are subsequently combined to form the relative arrangement of the cameras. This describes the procedure from the penultimate paragraph for the special case of a row arrangement. The method is considerably simplified using the prior knowledge that there are in each case only right and left neighbors or only one neighbor at the margin.

The cameras are preferably of the same construction among one another and/or are originally configured identically with a basic setting. The cameras therefore do not differ originally, which relates both to the construction design and to the settings that are set to factory settings, for example. However, the cameras preferably still have at least one individual feature such as a serial number that is also known to the control and evaluation unit and can thus be communicated. There would, however, otherwise also be methods by which each camera provides a random individual feature with which subsequently collisions with nevertheless the same feature can be resolved. It is furthermore not precluded that the cameras are, for example, downward compatible devices of different dates of manufacture. A heterogenous arrangement with different cameras is also conceivable.

An automatic device code preferably recognizes the cameras connected in the network. Even more preferably, one camera is fixed as the master, with the selection criterion not being further determined; for example the first recognized camera, the one with the smallest serial number, or a random camera. Alternatively, an external control can also take over the function of the master or a different network structure without a master at all can be selected.

A provisional network configuration is preferably assigned to each camera, in particular by a camera configured as the master. This is a procedure to initially be able to set up a network and to be able to communicate with the cameras in some manner at all. This first configuration otherwise still does not have to satisfy any special demands, but rather, for example, random or fixed IP addresses or other addresses are distributed in any desired order depending on the network technology. The master preferably takes over this work. It is conceivable that the camera respectively addressed provides a sign, for instance briefly activates its illumination so that the service engineer can check whether all the cameras have been taken into account. The relative arrangement of the cameras is not known to the system at this time.

A new network configuration that corresponds to the relative arrangement of the cameras with respect to one another is preferably assigned to the cameras. This is now not a preparatory step, but rather a downstream step once the relative arrangement has been discovered. The cameras are so-to-say numbered in the correct order. This facilitates further configuration steps and a later service. The step is nevertheless optional since alternatively a link could also be made, for example, by tables between a network originally issued without knowledge of the arrangement and the then found arrangement of the cameras with respect to one another.

The cameras preferably each record a reference image while no illumination is active and the reference image is taken into account in the check of the sample recordings. This reference image recording preferably takes place synchronously and thus under comparable environmental light conditions. It is possible to evaluate better later using the reference images whether and from which direction the illumination of a different camera can be recognized in a sample recording. A respective difference image is produced from the sample recording and the reference image, for example.

The cameras are preferably synchronized with one another. The master again preferably controls the synchronization. An at least almost simultaneous sample recording would alternatively also be conceivable by a trigger signal, but would be less precise. In addition, a synchronization of the cameras is of advantage for the later operation.

An individual autoconfiguration process is preferably triggered and carried out in the cameras. The master, for example, triggers the individual autoconfiguration process on after the other in the cameras. An at least partially pair-wise autoconfiguration of the cameras is also conceivable. The cameras here, for example, determine their own positions with respect to the detection zone using recordings of a calibration object. Further conceivable functions are the setting of the illumination, of a focus system, self-tests, and the like.

The relative arrangement of the cameras with respect to one another found from the sample recordings is preferably checked with respect to position information of the cameras that is in particular acquired by the cameras from recordings of a calibration object. The arrangement found is thereby subsequently verified. In principle, the respective positions could be used from the beginning to determine the relative arrangement. However, this is not so general and robust, for example when a camera is not able to determine its own position, there is no calibration object, or all the cameras cannot detect the calibration object. A simple verification can comprise the cameras activating their illumination again systematically after one another in the found arrangement and thus making any errors easily recognizable to the service engineer.

At least one camera is preferably parameterized, with system parameters being distinguished in the camera that have a significance for all the cameras and wherein, on the setting or changing of a system parameter in the parameterized camera, the system parameter is transferred to the other cameras. The cameras frequently still require a separate parameterization that depends, for example, on the position within the arrangement or on the perspective of the camera. There are individual parameters in this process only for this camera and for system parameters that have to be set consistently in all the cameras. There is, for example, internally a flag or a table to mark system parameters as such. It is optionally possible also to display whether it is a system parameter to the service engineer. If a system parameter is now changed, it is automatically transferred to the other cameras. This can take place directly or after completion of the parameterization of this camera. It is conceivable that the system parameter is still individually adapted or converted in the other cameras.

The cameras preferably record images of the objects and read codes applied there in an operating phase after the automatic configuration. The code reading can take place within the camera or in a higher ranking control, and indeed selectively on the level of the recordings of individual cameras or of an overall image composed of these recordings (image stitching). The cameras are preferably configured as camera-based code readers.

In the multi-camera system in accordance with the invention, the cameras are configured for the carrying out of an automatic configuration in accordance with an embodiment of one of the preceding claims. The multi-camera system preferably forms a reading tunnel for reading codes on objects that are conveyed through the reading tunnel.

The invention will be explained in more detail in the following also with respect to further features and advantages by way of example with reference to embodiments and to the enclosed drawing. The Figures of the drawing show in:

DETAILED DESCRIPTION

Figure 1:
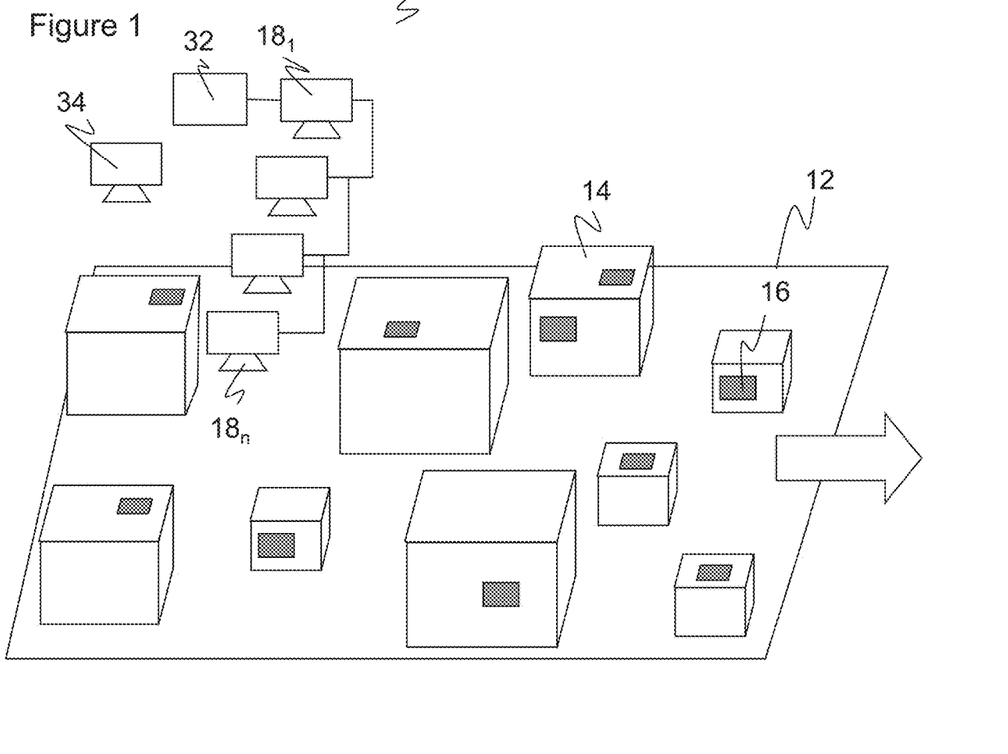
FIG. 1 a schematic three-dimensional view of a camera device above a conveyor belt with objects to be detected.

FIG. 1 shows a schematic three-dimensional view of a multi-camera system or of a camera device 10 above a conveyor belt 12 having objects 14 to be detected on which codes 16 are attached by way of example, but not necessarily. The conveyor belt 12 is an example for the production of a stream of objects 14 which move relative to the stationary camera device 10. Alternatively, the camera device 10 can also observe a scene without a conveyor belt 12. The camera device 10 comprises a plurality of cameras $18_1 \ldots 18_n$, where n=4 by way of example in FIG. 1. In addition to the shown cameras $18_1 \ldots 18_n$ in a perspective from above, further cameras can be installed from a different direction, for example laterally, to detect further object sides. A row arrangement of the cameras $18_1 \ldots 18_n$ is preferred, but a different arrangement, for example as a matrix is also conceivable.

Figure 2:
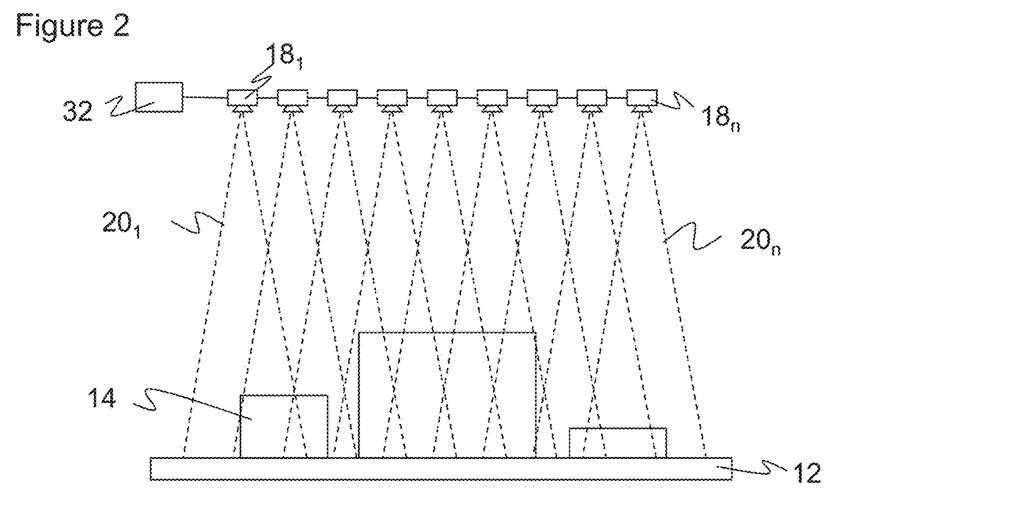
FIG. 2 a supplementary sectional representation of individual cameras of the camera device with their fields of view.
Figure 3:
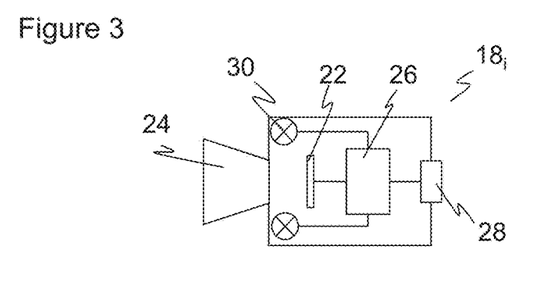
FIG. 3 a block diagram of an individual camera.

FIG. 2 additionally shows the arrangement of the cameras $18_1 \ldots 18_n$ and their fields of view $20_1 \ldots 20_n$ above the conveyor belt 12 in a sectional representation, with now a different example with more cameras $18_1 \ldots 18_n$ being selected, and FIG. 3 shows an individual camera 18i. The cameras $18_1 \ldots 18_n$ each have an image sensor 22 having a plurality of light reception elements arranged to form a pixel row or a pixel matrix as well as an objective 24. A respective control and evaluation unit 26 reads image data, is responsible for camera related control work and evaluations and enables the link to a network via a communication point 28, for instance via Ethernet or CAN. The cameras $18_1 \ldots 18_n$ furthermore have an illumination 30 to illuminate their own fields of view $20_1 \ldots 20_n$ on a recording. A higher ranking control 32 is provided in the network whose work can instead be taken over by a camera $18_1 \ldots 18_n$. The cameras $18_1 \ldots 18_n$ are preferably of the same design among one another to reduce system complexity. They can, however, work with different configurations and recording parameters.

In a preferred embodiment, the cameras $18_1 \ldots 18_n$ are configured as code readers in which the control and evaluation unit 26 additionally acts as a decoding unit for reading code information and corresponding preprocessing for localizing and preparing code regions. It is also conceivable to detect streams of objects 14 without codes 16 and accordingly to dispense with the decoding unit itself or its use, for example for an inspection or quality control. In addition, a decoding on their image data can also take place downstream outside the cameras $18_1 \ldots 18_n$, in particular in the higher ranking control 32.

The conveyor belt 12 is too wide to be detected by an individual camera $18_1 \ldots 18n$. The fields of view $20_1 \ldots 20_n$ of the cameras $18_1 \ldots 18_n$ therefore complement one another in the transverse direction of the conveyor belt 12 with a partial mutual overlap. An optional geometry detection sensor 34, for example in the form of a distance measuring laser scanner known per se, is arranged above the individual cameras $18_1 \ldots 18_n$ with respect to the direction of movement of the conveyor belt 12 to measure the three-dimensional contour of the objects 14 on the conveyor belt 12 in advance, with dimensions, volume, position, and shape resulting therefrom. In addition, the geometry data can be used to trigger the recordings and to focus the cameras $18_1 \ldots 18_n$.

FIG. 4 again shows the arrangement of a camera device 10 with now five cameras $18_1 \ldots 18_n$ in a bird's eye perspective (top reading) for the further examples. A calibration object 36 that can be formed, for example, as a box or as a poster is arranged in the detection zone. The calibration object 36 has codes and other test patterns of a known kind and dimensions and thus enables the cameras $18_1 \ldots 18_n$ to calibrate various parameters including their own positions. The use of a calibration object 36 is advantageous in a number of cases, but is not absolutely necessary for the now described configuration.

Figure 5:
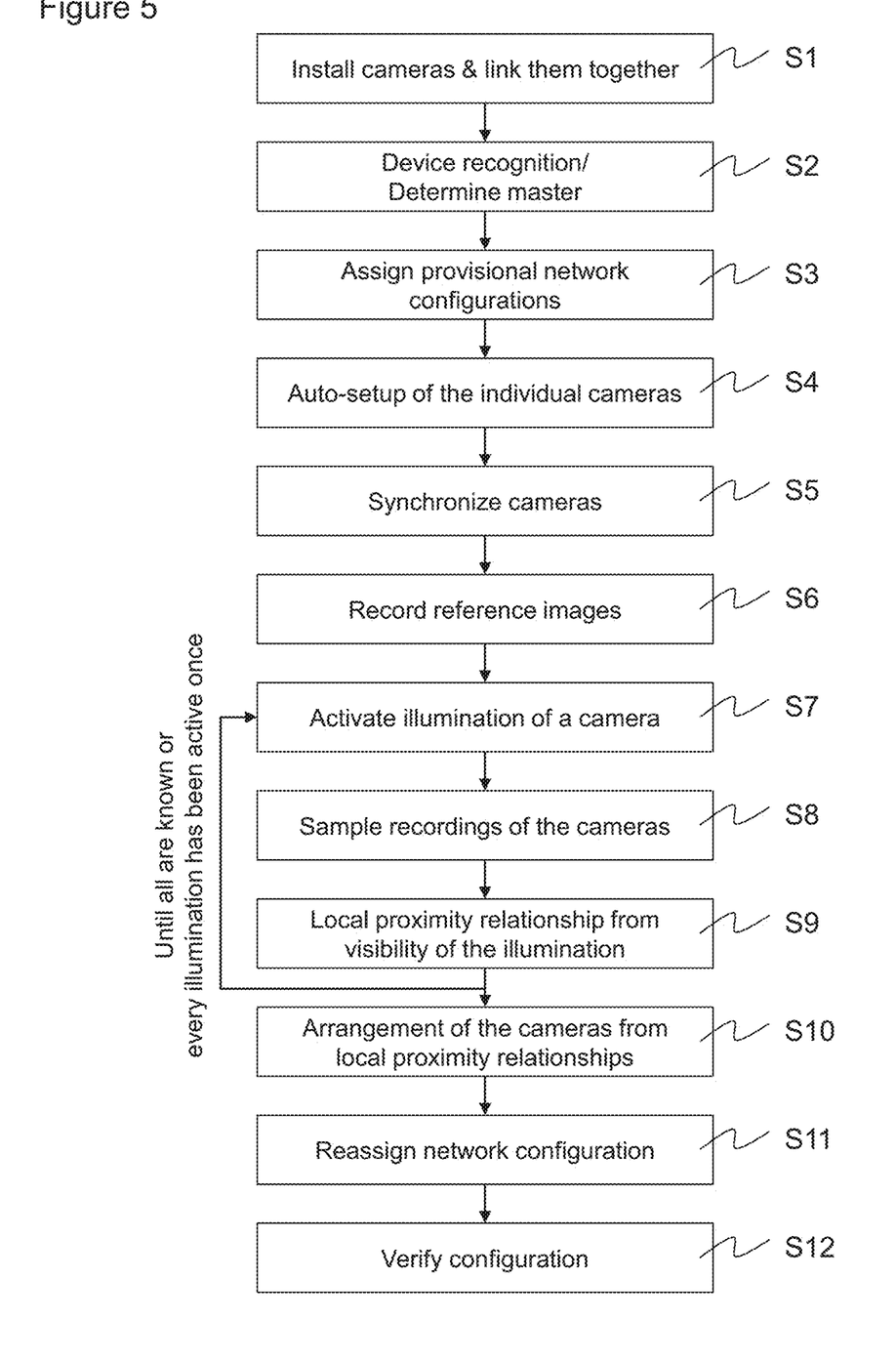
FIG. 5 an exemplary flowchart for an automatic configuration.

FIG. 5 shows a flowchart for an automatic configuration of the camera device 10. A particularly advantageous automatic configuration is achieved with these steps, but each step that is not explicitly marked as indispensable is to be considered optional.

In a step S1, the cameras $18_1 \ldots 18_n$ are first installed and physically connected to one another. In the starting state, the cameras $18_1 \ldots 18_n$ are at the works setting with the same network setting, that is, for example, mutually identical IP addresses and device addresses, that are here called CAN node ID. The specific embodiment of the network setting can vary and depends on the network architecture used. The cameras $18_1 \ldots 18_n$, however, preferably have a unique serial number or another feature such as a MAC address. An individualizing feature could otherwise also be negotiated. A configuration processor is preferably connected during the configuration, in particular to the higher ranking control 32, to start, to observer, and optionally to complement or change the configuration. A control element is, however, also conceivable at the camera $18_1 \ldots 18_n$ itself, for instance a button that triggers the configuration.

In a step S2, the connected cameras $18_1 \ldots 18_n$ are first recognized. A master is preferably selected and configured to which a corresponding IP address is assigned. The master than controls the further procedure. Alternatively to a master camera, a master in the higher ranking control 32 can also take over this function. The method does not rely on a master-slave architecture, but will be described on this basis below.

In a step S3, the master assigns a provisional network setting to the other cameras $18_1 \ldots 18_n$, with a unique IP address and a unique node ID being determined with reference to the respective serial number, for example. A double assignment of possible addresses can be precluded by a further network scan. The cameras $18_1 \ldots 18_n$ can optionally still be required to provide a sign, for example by activating their illumination 30, so that a service engineer can see whether all the cameras $18_1 \ldots 18_n$ have been found and integrated in the network.

Figure 4:
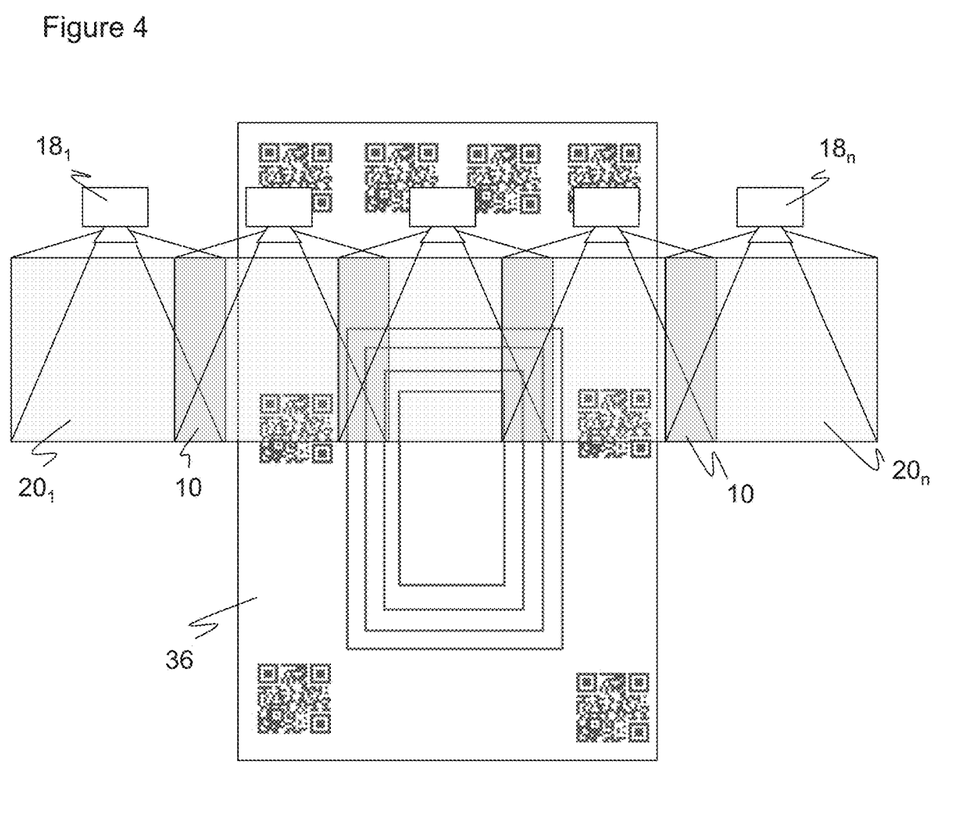
FIG. 4 a further view of a camera device with a calibration object in the fields of view of the cameras.

In a step S4, the master starts an individual automatic setup in every camera $18_1 \ldots 18n$. This is coordinated such that mutual interference is avoided. The calibration object 36 explained with reference to FIG. 4 is preferably located in the fields of view $20_1 \ldots 20_n$ of the cameras $18_1 \ldots 18_n$ for this purpose. Distortion is corrected, focusing carried out, pixel sizes determined, and distances and angles for the calibration of the position are calculated in the setup. After the automatic setup, cameras $18_1 \ldots 18_n$ that are in particular configured as code readers are able to read the codes of the calibration object 36 and thus possibly to set further parameters.

In a step S5, the master starts a synchronization service in all cameras $18_1 \ldots 18_n$. This subsequently enables a synchronized triggering of the image recording and the illumination. There could otherwise be interference due to simultaneous flash light, for example.

In a step S6, all the cameras $18_1 \ldots 18_n$ record a reference image with an inactive illumination 30 and store it for later applications. The reference image delivers information on the environmental light situation and is taken into account later, for example, in that is it removed from further recordings.

In the steps S7 to S10, the cameras $18_1 \ldots 18_n$ independently find their relative arrangement with respect to one another. In a step S7, only one camera $18_1 \ldots 18_n$ activates its illumination 30. All the cameras $18_1 \ldots 18n$, possibly with the exception of the one with an active illumination 30, generate a sample recording in a step S8. The direction in which the camera $18_1 \ldots 18_n$ having the active illumination 30 is located is determined by evaluation of the sample recording in a step S9. The reference image is taken into account here to preclude environmental artifacts. A distinction only has to be made between left and right in a row arrangement, with a distinction optionally being able to be made by a comparison of the degree of illumination whether it is the next neighbor or one further remote. Local proximity relationships of the camera $18_1 \ldots 18_n$ are thus derived from the visibility of the illumination. Steps S7 to S9 are repeated until every camera $18_1 \ldots 18_n$ has had its turn with the activation of its illumination 30 once.

In a step S10, the local proximity relationships are finally collected and combined by the master. A final or global proximity relationship is thereby produced or the sought relative arrangement of the cameras $18_1 \ldots 18_n$ to one another is now known. This step can be brought forward to decide after every run of steps S7 to S9 whether the relative arrangement of the cameras $18_1 \ldots 18_n$ has already been uniquely fixed and the loop can be aborted.

Figure 6:
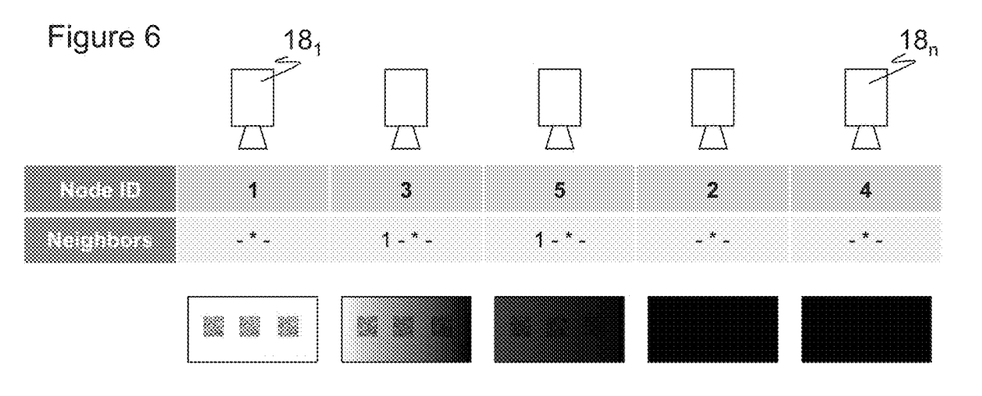
FIGS. 6-10 an illustration of the determination of local proximity relationships by sample recordings while only one camera activates its illumination.

The steps S7 to S10 are illustrated in FIGS. 6 to 10 and will be explained again in more detail. FIG. 6 shows sample recordings while the master itself, that is the camera $18_1$, with node ID 1, activates its illumination 30. This order is not compulsory; a different camera $18_1 \ldots 18_n$ can begin and the master could conversely also be a different camera $18_1 \ldots 18_n$. It must be noted that unordered node IDs and equally other network settings such as IP addresses and the like are assigned to the cameras $18_1 \ldots 18_n$ in this phase. The physical arrangement is not yet known; the distribution of the provisional network settings is effectively random and is indicated here by way of example as an order 1-3-5-2-4. Finding this order is the aim of steps S7 to S10. The cameras having node IDs 3 and 5 determine that the camera having the node ID 1 is to the left of them by the sample recordings illustrated in FIG. 6.

Figure 7:
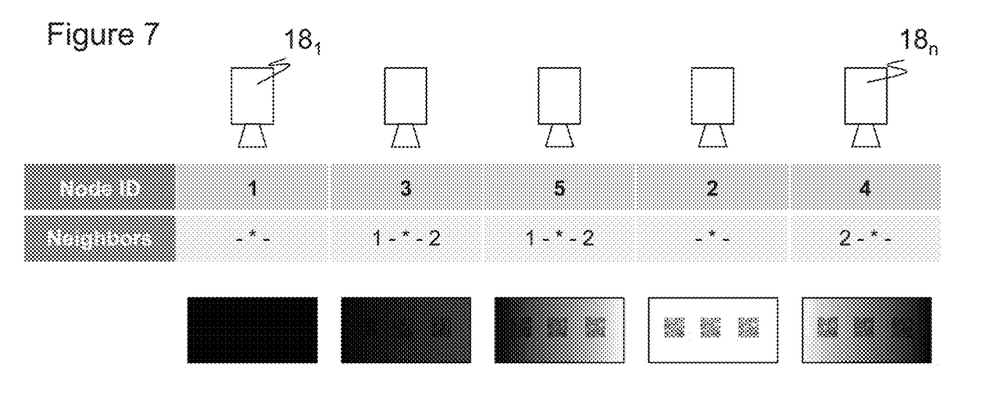

FIG. 7 shows sample recordings while the camera having node ID 2 activates its illumination 30. The cameras having node IDs 3 and 5 determine that the camera having node ID 2 is at the right using its sample recordings. It could additionally be determined by a comparison of the sample recordings with one another that the cameras having node IDs 3 and 2 are not direct neighbors. The camera having node ID 4 recognizes the camera having node ID 2 as the left neighbor.

Figure 8:
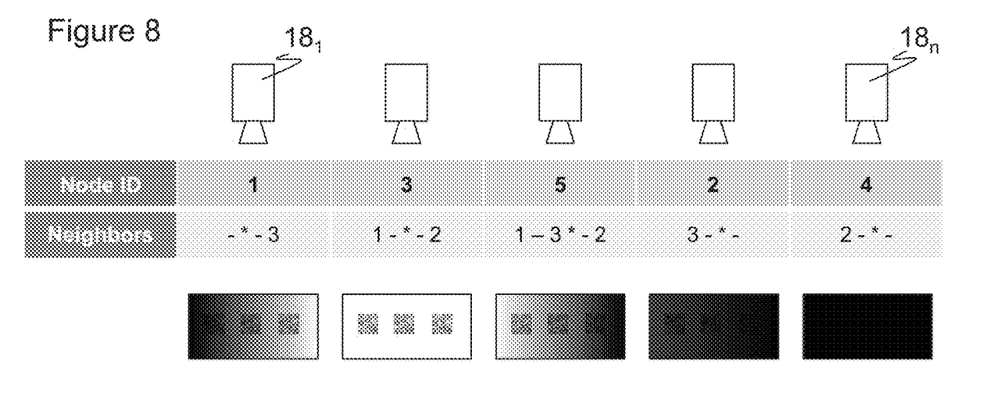

FIG. 8 shows sample recordings while the camera having node ID 3 activates its illumination 30. The camera having node ID 3 is recognized as the right neighbor of the camera having node ID 1 and as the left neighbor of the cameras having node IDs 5 and 2. The configuration would already be uniquely recognized after this run and the loop could be aborted.

Figure 9:
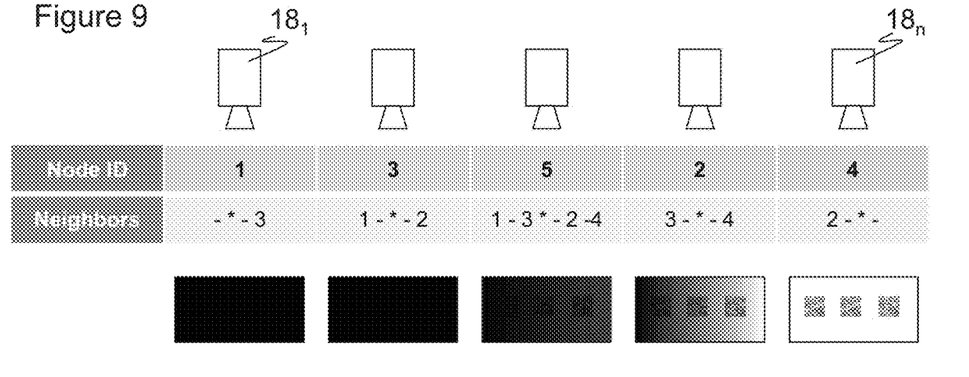
Figure 10:
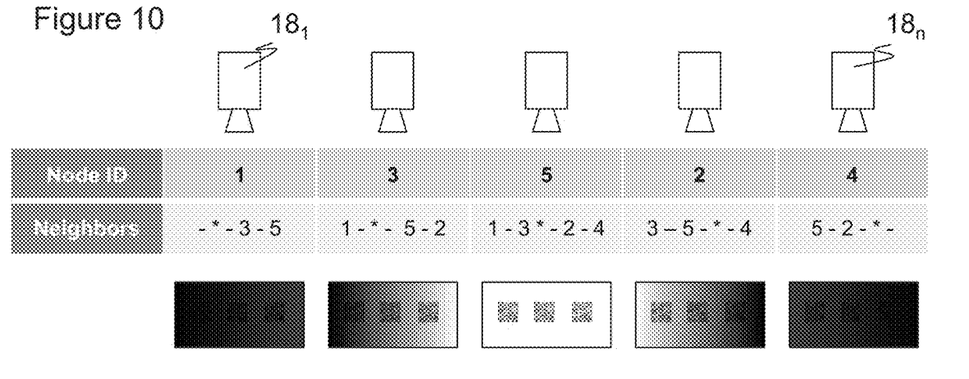

FIG. 9 nevertheless shows for reasons of completeness sample recordings while the remaining camera having node ID 5 activates its illumination 30. The camera having node ID 5 is recognized as the right neighbor of the camera having node IDs 1 and 3 as the left neighbor of the cameras having node IDs 5 and 2.

Now that the relative arrangement of the cameras $18_1 \ldots 18_n$ is known, new network configurations can be distributed in a step S11 so that the physical and logical arrangements correspond to one another. This step is not required for the function since the association can also be ensured in a different manner, but does facilitate the further handling, for example on a later exchange of devices.

Figure 11:
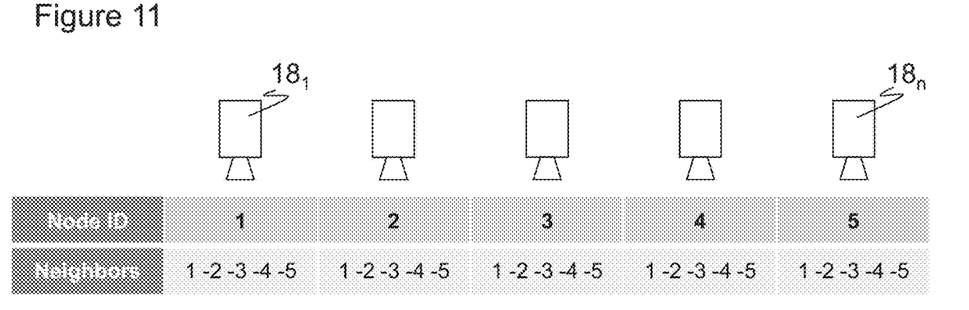
FIG. 11 an illustration of the finally found relative arrangement of the cameras and of the network setting thereupon newly issued.

FIG. 11 illustrates the result. Node IDs are now assigned to the cameras that correspond to the order in the line arrangement. The original effectively random proximity 1-3-5-2-4 is now an ordered proximity 1-2-3-4-5.

The configuration can be verified again in a final step S12. This can involve the service engineer in that, for example, the cameras $18_1 \ldots 18_n$ activate their illumination 30 after one another. If the cameras have determined their own positions in step S4, these positions can be compared with the relative arrangement found in step S10. In addition, a network scan can again be carried out to check for IP addressed issued twice and the like.

The individual cameras $18_1 \ldots 18_n$ are preferably subsequently individually parameterized. System parameters are here also set or changed in some cases that are not only of significance for the currently parameterized camera $18_1 \ldots 18n$, but also for the other cameras $18_1 \ldots 18n$. This information has to be kept constant over the camera device 10, however.

The system parameters as such are known in an embodiment for this purpose, for example by a corresponding flag or a table that determines for every parameter whether it is a system parameter or not. If a configuration relates to a system parameter, this is transferred to the required other cameras $18_1 \ldots 18_n$, and indeed selectively immediately or after completion of the configuration of a camera $18_1 \ldots 18_n$. This information whether it is a system parameter or that it is now also transferred to the other cameras $18_1 \ldots 18_n$ can, but does not have to, be displayed to the service engineer since the camera device 10 itself takes care of consistently distributing system parameters in the background.

The service engineer can thus optimize the camera device 10 by settings at the individual cameras $18_1 \ldots 18_n$ without having to take care that the system parameters remain constant over the camera device 10. The service engineer does not even have to know which parameters are such system parameters that also have to be communicated to the other cameras $18_1 \ldots 18_n$.

The invention claimed is:

1. A method for the automatic configuration of a plurality of cameras that each have an image sensor, an illumination, and a communication interface and together record objects in a detection zone by partially overlapping, mutually complementary fields of view, wherein the cameras are connected via their communication interfaces to form a network, wherein the cameras produce sample recordings while selected ones of the cameras selectively activate their illumination and a check is made for the respective cameras with reference to the sample recordings whether they detect the active illumination and thus there is a proximity relationship to a camera having active illumination, and wherein a relative arrangement of the cameras with respect to one another is determined from the proximity relationship of the respective camera to the camera having active illumination.

2. The method in accordance with claim 1,
wherein the objects are present in a stream of objects conveyed through the detection zone, which move relative to the cameras.

3. The method in accordance with claim 1,
wherein sample recordings are repeatedly produced while exactly one camera alternatingly activates its illumination.

4. The method in accordance with claim 1,
wherein first, a proximity relationship is determined per camera from an information on the direction in which the camera having active illumination is disposed in accordance with the check of the sample recordings; and wherein the proximity relationships with respect to the relative arrangement of the cameras are subsequently collected.

5. The method in accordance with claim 1,
wherein the cameras form a row arrangement having fields of view partially overlapping in pairs.

6. A method for the automatic configuration of a plurality of cameras that each have an image sensor, an illumination, and a communication interface and together record objects in a detection zone by partially overlapping, mutually complementary fields of view, wherein the cameras are connected via their communication interfaces to form a network, wherein the cameras produce sample recordings in accordance with a check made for the respective cameras with reference to the sample recordings whether there is a proximity relationship to a camera having active illumination, wherein a relative arrangement of the cameras with respect to one another is determined from the proximity relationships, and wherein first, the proximity relationship is determined per camera from an information on a direction in which the camera having active illumination is disposed in accordance with the check of the sample recordings, and wherein proximity relationships with respect to the relative arrangement of the cameras are subsequently collected, wherein second, it is determined by checking the sample recordings per camera whether the camera having active illumination is located to the right, left, or not having a predetermined proximity relationship and wherein the proximity relationships thus acquired are subsequently combined to form the relative arrangement of the cameras.

7. The method in accordance with claim 1, wherein the cameras are of the same construction among one another and/or are configured originally identical with a basic setting.

8. The method in accordance with claim 1, wherein an automatic device recognition recognizes the cameras connected in the network.

9. The method in accordance with claim 8, wherein the automatic device recognition determines one camera as a master.

10. The method in accordance with claim 1, wherein a provisional network configuration is assigned to every camera.

11. A method for the automatic configuration of a plurality of cameras that each have an image sensor, an illumination, and a communication interface and together record objects in a detection zone by partially overlapping, mutually complementary fields of view, wherein the cameras are connected via their communication interfaces to form a network, wherein the cameras produce sample recordings, wherein a check is made for the respective cameras with reference to the sample recordings whether there is a proximity relationship to a camera having active illumination, wherein a relative arrangement of the cameras with respect to one another is determined from the proximity relationships of the respective cameras, and wherein a provisional network configuration is assigned to every camera by a camera configured as a master.

12. A method for the automatic configuration of a plurality of cameras that each have an image sensor, an illumination, and a communication interface and together record objects in a detection zone by partially overlapping, mutually complementary fields of view, wherein the cameras are connected via their communication interfaces to form a network, wherein the cameras produce sample recordings, wherein a check is made for the respective cameras with reference to the sample recordings whether there is a proximity relationship to a camera having active illumination, wherein a relative arrangement of the cameras with respect to one another is determined from the proximity relationships of the respective cameras, and wherein a new network configuration is assigned to the cameras that corresponds to the relative arrangement of the cameras with respect to one another.

13. The method in accordance with claim 1, wherein the cameras each record a reference image while no illumination is active and the reference image is taken into account in the check of sample recordings.

14. The method in accordance with claim 1, wherein the cameras are synchronized.

15. The method in accordance with claim 1, wherein an individual autoconfiguration method is triggered and performed in the cameras by which their own positions with respect to the detection zone are determined, using recordings of a calibration object in a field of view of at least one of the cameras.

16. The method in accordance with claim 15, wherein the individual autoconfiguration method is triggered and performed in the cameras by which their own positions with respect to the detection zone are determined using recordings of a calibration object.

17. The method in accordance with claim 1, wherein the relative arrangement of the cameras with respect to one another found from the sample recordings is checked using position information of the cameras that is in particular acquired from recordings of a calibration object.

18. The method in accordance with claim 1, wherein at least one camera is parameterized; wherein system parameters are distinguished in the cameras that have a parameterization significance for the cameras; and
wherein on the setting or changing of a system parameter in a parameterized camera, the system parameter is transferred to the other cameras.

19. The method in accordance with claim 1, wherein the cameras record images of the objects and read codes affixed thereto in an operating phase after the automatic configuration.

20. A multi-camera system having a plurality of cameras, wherein the cameras each have an image sensor, an illumination, and a communication interface and that are installed such that they together record objects in a detection zone by partially overlapping, mutually complementary fields of view; wherein the cameras are connected via their communication interfaces to form a network; and wherein the cameras are configured for performing an automatic configuration in a method for the automatic configuration of the plurality of cameras that together record objects in a detection zone by partially overlapping, mutually complementary fields of view, wherein the cameras are connected via their communication interfaces to form a network, wherein the cameras produce sample recordings while ones of the cameras selectively activate their illumination and a check is made for the respective cameras with reference to the sample recordings whether they detect the active illumination and thus there is a proximity relationship to the camera having active illumination, and wherein a relative arrangement of the cameras with respect to one another is determined from the proximity relationships.

21. The multi-camera system in accordance with claim 20, further comprising a reading tunnel for reading codes on objects that are conveyed through the reading tunnel.

* * * * *